United States Patent
Nakano et al.

[11] Patent Number: 5,952,666
[45] Date of Patent: Sep. 14, 1999

[54] RADIATION IMAGE CONVERSION PANEL

[75] Inventors: Yasushi Nakano; Akihiro Maezawa; Haruhiko Masutomi; Hideaki Wakamatsu, all of Tokyo, Japan

[73] Assignee: Konica Corporation, Japan

[21] Appl. No.: 09/019,680

[22] Filed: Feb. 6, 1998

[30] Foreign Application Priority Data

Feb. 12, 1997 [JP] Japan ..................... 9-042957

[51] Int. Cl.⁶ .................................. C09K 11/61
[52] U.S. Cl. ........................ 250/484.4; 250/581
[58] Field of Search ............... 250/484.4, 484.3, 250/581; 252/301.4 H

[56] References Cited

U.S. PATENT DOCUMENTS

| | | |
|---|---|---|
| 3,923,682 | 12/1975 | Dale et al. . |
| 4,107,070 | 8/1978 | Everts et al. . |
| 4,239,968 | 12/1980 | Kotera et al. . |
| 4,524,016 | 6/1985 | Ferretti . |
| 4,535,237 | 8/1985 | Takahashi et al. . |
| 5,549,843 | 8/1996 | Smith et al. ................. 250/484.4 |

FOREIGN PATENT DOCUMENTS 9003738  9/1990  WIPO .

OTHER PUBLICATIONS

European Search Report EP 98 30 0991.
Patent Abstracts of Japan, Publication #06306358, Publication date: Jan. 11, 1994.
Patent Abstracts of Japan, Publication #02173181, Publication date: Apr. 07, 1990.

*Primary Examiner*—Edward P. Westin
*Assistant Examiner*—Richard Hanig
*Attorney, Agent, or Firm*—Jordan B. Bierman; Bierman, Muserlian and Lucas

[57] ABSTRACT

A radiation image conversion panel comprising a support having thereon a phosphor layer containing a binder and a stimulable phosphor, wherein, when the phosphor layer is excited by being exposed to light at a maximum excitation wavelength ($\lambda 1$) of the phosphor, a maximum peak intensity of instantaneous emission (Int.) emitted from the phosphor layer satisfies the following:

$$500 \leq Int. \leq 5000$$

provided that the Int. is a maximum emission intensity at a wavelength within the range of 185 to 800 nm, except for wavelengths of $\lambda 1$ and $2 \times \lambda 1$, and the Int. being expressed as a relative value, based on a peak intensity of Raman scattering of water excited with light at a wavelength of 350 nm being 1.

7 Claims, No Drawings

RADIATION IMAGE CONVERSION PANEL

FIELD OF THE INVENTION

The present invention relates to a radiation image conversion panel by the use of a rare earth activated alkaline earth metal fluorohalide stimulable phosphor.

BACKGROUND OF THE INVENTION

As a method replacing a conventional radiography, there is known a radiation image recording and reproducing method utilizing stimulable phosphor, as described in JP-A 55-12145 (herein, the term "JP-A" means an unexamined and published Japanese Patent Application). In the method, a radiation image conversion panel (in other words, an image storage phosphor sheet) comprising a stimulable phosphor is employed, and the method comprises the steps of causing the stimulable phosphor of the panel to absorb radiation having passed through an object or having radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photoelectrically detecting the emitted light to obtain electric signals, and reproducing the radiation image of the object as a visible image from the electric signals. The panel having been read out is subjected to image-erasing and prepared for the next photographing cycle. Thus, the radiation image conversion panel can be used repeatedly.

The stimulable phosphor, after being exposed to radiation, exhibits stimulated emission upon exposure to the stimulating ray. In practical use, phosphors are employed, which exhibit an emission within a wavelength region of 300 to 500 nm stimulated by stimulating light with wavelengths of 400 to 900 nm.

The radiation image conversion panel employed in the radiation image recording and reproducing method basically comprises a support and provided thereon a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder and comprises an aggregated stimulable phosphor.

There is further known a radiation image conversion panel in which a polymeric material is contained in the openings among the aggregated stimulable phosphor. In these phosphor layers, the stimulable phosphor also exhibits stimulated emission upon exposure to the stimulating rays after absorbing radiation such as X-rays, so that the radiation having passed through an object or having been emitted from the object, is absorbed by the stimulable phosphor layer of the radiation image conversion panel, in proportion to the radiation amount and a radiation image of the object is formed on the panel, as a storage image of radiation energy. The storage image can be released by irradiating the stimulating ray, as stimulating emission light, which is photoelectrically read and transformed into electric signals to form an image as the storage image of radiation energy.

On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

Examples of the stimulable phosphor used in the radiation image conversion panel include, (1) a rare earth activated alkaline earth metal fluorohalide phosphor represented by the formula of $(Ba_{1-x}, M^{2+}{}_x)FX:yA$, as described in JP-A 55-12145, in which $M^{2+}$ is at least one of Mg, Ca, Sr, Zn and Cd; X is at least one of Cl, Br and I; A is at least one of Eu, Tb, Ce, Tm, Dy, Pr, Ho, Nd, Yb, and Er; x and y are numbers meeting the conditions of $0 \leq x \leq 0.6$ and $0 \leq y \leq 0.2$; and the phosphor may contain the following additives:

X', BeX" and $M^3X_3'''$, as described in JP-A 56-74175 (in which X', X" and X''', are respectively a halogen atom selected from the group of Cl, Br and I; and $M^3$ is a trivalent metal);

a metal oxide described in JP-A 55-160078, such as BeO, BgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$ or $ThO_2$;

Zr and Sc described in JP-A 56-116777;

B described in JP-A 57-23673; As and Si described in JP-A 57-23675;

M·L (in which M is an alkali metal selected from the group of Li, Na, K, Rb and Cs; L is a trivalent metal Sc, Y, La, Ce, Pr, Nd, Pm, Sm, Gd, Tb, Dy, Ho, Er, Tm, Yb, Lu, Al, Ga, In, and Tl) described in JP-A 58-206678;

calcined tetrafluoroboric acid compound described in JP-A 59-27980;

calcined, univalent or divalent metal salt of hexafluorosilic acid, hexafluorotitanic acid or hexafluorozirconic acid described in JP-A 59-27289;

NaX' described in JP-A 59-56479 (in which X' is at least one of Cl, Br and I);

a transition metal such as V, Cr, Mn, Fe, Co or Ni, as described in JP-A 59-56479;

$M^1X'$, $M^{'2}X''$, $M^3X'''$ and A, as described in JP-A 59-75200 (in which $M^1$ is an alkali metal selected from the group of Li, Na, K, Rb and Cs; $M^{'2}$ is a divalent metal selected from the group of Be and Mg; $M^3$ is a trivalent metal selected from the group Al, Ga, In and Tl; A is a metal oxide; X', X" and X''' are respectively a halogen atom selected from the group of F, Cl, Br and I); $M^1X'$ described in JP-A 60-101173 (in which $M^1$ is an alkali metal selected from the group of Rb and Cs; and X' is a halogen atom selected from the group of F, Cl, Br and I);

$M^{2'}X'_2 \cdot M^{2'}X''_2$ (in which $M^{2'}$ is at least an alkaline earth metal selected from the group Ba, Sr and Ca; X' and X" are respectively a halogen atom selected from the group of Cl, Br and I, and $X' \neq X''$); and $LnX''_3$ described in Japanese Patent Application No. 60-106752 (in which Ln is a rare earth selected from the group of Sc, Y, La, Ce, Pr, Nd, Pm, Sm, Gd, Tb, Dy, Ho, Er, Tm, Yb and Lu; X" is a halogen atom selected from the group of F, Cl, Br and I);

(2) a divalent europium activated alkaline earth metal halide phosphor described in JP-A 60-84381, represented by the formula of $M^2X_2 \cdot aM^{2'}{}_2:xEu^{2+}$ (in which $M^2$ is an alkaline earth metal selected from the group of Ba, Sr and Ca; X and X' is a halogen atom selected from the group of Cl, Br and I and $X \neq X'$; a and x are respectively numbers meeting the requirements of $0 \leq a \leq 0.1$ and $0 \leq x \leq 0.2$);

the phosphor may contain the following additives;

$M^1X''$ described in JP-A 60-166379 (in which $M^1$ is an alkali metal selected from the group of Rb, and Cs; X" is a halogen atom selected from the group of F, Cl, Br and I;

KX", MgX$_2$'" and M$^3$X$_3$"" described in JP-A 221483 (in which M$^3$ is a trivalent metal selected from the group of Sc, Y, La Gd and Lu; X", X'" and X"" are respectively a halogen atom selected from the group of F, Cl Br and I;

B described in JP-A 60-228592;

an oxide such as SiO$_2$ or P$_2$O$_5$ described in JP-A 60-228593;

LiX" and NaX" (in which X" is a halogen atom selected from the group of F, Cl, Br and I;

SiO described in JP-A 61-120883;

SnX$_2$" described in JP-A 61-120885 (in which X" is a halogen atom selected from the group of F, Cl, Br and I;

CsX" and SnX$_2$'" described in JP-A 61-235486 (in which X" and X'" are respectively a halogen atom selected from the group of F, Cl, Br and I;

CsX" and Ln$^{3+}$ described in JP-A 61-235487 (in which X" is a halogen atom selected from the group of F, Cl, Br and I; Ln is a rare earth element selected from the group of Sc, Y, Ce, Pr, Nd, Sm, Gd, Tb, Dy, Ho, Er, Tm, Yb and Lu;

(3) a rare earth element activated rare earth oxyhalide phosphor represented by the formula of LnOX:xA, as described in JP-A 55-12144 (in which Ln is at least one of La, Y, Gd and Lu; A is at least one of Ce and Tb; and x is a number meeting the following condition, 0<x<0.1);

(4) a cerium activated trivalent metal oxyhalide phosphor represented by the formula of M$^3$OX:xCe, as described in JP-A 58-69281 (in which M$^3$ is an oxidized metal selected from the group of Pr, Nd, Pm, Sm, Eu, Tb, Dy, Ho, Er, Tm, Yb and Bi; X is a halogen atom selected from the group of Cl, Br and I; x is a number meeting the following condition, 0<x<0.1;

(5) a bismuth activated alkali metal halide phosphor represented by the formula of M$^1$X:xBi, as described in Japanese Patent Application No.60-70484 (in which M$^1$ is an alkali metal selected from the group of Rb and Cs; X is a halogen atom selected from the group of Cl, Br and I; x is a number meeting the following condition, 0<x≦0.2;

(6) a divalent europium activated alkaline earth metal halophosphate phosphor represented by the formula of M$^2_5$(PO$_4$)$_3$X:xEu$^{2+}$, as described in JP-A 60-141783 (in which M$^2$ is an alkaline earth metal selected from the group of Ca, Sr and Ba; X is a halogen atom selected from the group of F, Cl, Br and I; x is a number meeting the following condition, 0<x≦0.2);

(7) a divalent europium activated alkaline earth metal haloborate phosphor represented by the formula of M$^2_2$BO$_3$X:xEu$^{2+}$, as described in JP-A 60 157099 (in which M$^2$ is an alkaline earth metal selected from the group of Ca, Sr and Ba; X is a halogen atom selected from the group of Cl, Br and I; x is a number meeting the following condition, 0<x≦0.2);

(8) a divalent europium activated alkaline earth metal halophosphate phosphor represented by the formula of M$^2_2$PO$_4$X:xEu$^{2+}$, as described in JP-A 60-157100 (in which M$^2$ is an alkaline earth metal selected from the group of Ca, Sr and Ba; X is a halogen atom selected from the group of Cl, Br and I; x is a number meeting the following condition, 0<x≦0.2);

(9) a divalent europium activated alkaline earth metal hydrogenated halide phosphor represented by the formula of M$^2$HX:xEu$^{2+}$, as described in JP-A 60-217354 (in which M$^2$ is an alkaline earth metal selected from the group of Ca, Sr and Ba; X is a halogen atom selected from the group of Cl, Br and I; x is a number meeting the following condition, 0<x≦0.2);

(10) a cerium activated rare earth complex halide phosphor represented by the formula of LnX$_3$·aLn'X$_3$':xCe$^{3+}$, as described in JP-A 61-21173 (in which Ln and Ln' are respectively a rare earth element selected from the group of Y, La, Gd and Lu; X and X' are respectively a halogen atom selected from the group of F, Cl, Br and I and X≠X'; a and x are respectively numbers meeting the following conditions, 0.1<a≦10.0 and 0<x≦0.2;

(11) a cerium activated rare earth complex halide phosphor represented by the formula of LnX$_3$·aM$^1$X'X:xCe$^{3+}$, as described in JP-A 61-21182 (in which Ln and Ln' are respectively a rare earth element selected from the group of Y, La, Gd and Lu; M$^1$ is an alkali metal selected from the group of Li, Na, k, Cs and Rb; X and X' are respectively a halogen atom selected from the group of Cl, Br and I; a and x are respectively numbers meeting the following conditions, 0.1<a≦10.0 and 0<x≦0.2;

(12) a cerium activated rare earth halophosphate phosphor represented by the formula of LnPO$_4$·aLnX$_3$:xCe$^{3+}$, as described in JP-A 61-40390 (in which Ln is a rare earth element selected from the group of Y, La, Gd and Lu; X is a halogen atom selected from the group of F, Cl, Br and I; a and x are respectively numbers meeting the following conditions, 0.1<a≦10.0 and 0<x≦0.2;

(13) a divalent europium activated cesium rubidium halide phosphor represented by the formula of CsX:aRbX':xEu$^{2+}$, as described in Japanese Patent Application No.60-78151 (in which X and X' are respectively a halogen atom selected from the group of Cl, Br and I; a and x are respectively numbers meeting the following conditions, 0.1<a≦10.0 and 0<x≦0.2;

(14) a divalent europium activated complex halide phosphor represented by the formula of M$^2$X$_2$·aM$^1$X':xEu$^{2+}$, as described in Japanese Patent Application No.60-78153 (in which M$^2$ is an alkaline earth metal selected from the group of Ba, Sr and Ca; M$^1$ is an alkali metal selected from the group of Li, Rb and Cs; X and X' are respectively a halogen atom selected from the group of Cl, Br and I; a and x are respectively numbers meeting the following conditions, 0.1<a<20.0 and 0<x<0.2.

To obtain enhanced stimulated emission of a radiation image conversion panel, it is indispensable to activate an activator contained in the phosphor in preparation of conventionally known stimulable phosphors. For example, a rare earth metal such as Eu or Ce is contained, as an activator, in a BaFBr phosphor in an amount of 1×10$^{-2}$ to 1×10$^{-8}$ mol, and after being subjected to calcination treatment, the activator is occluded in the BaFBr crystal body in the form of Eu$^{2+}$ or Ce$^{2+}$, leading to enhanced stimulated emission.

In conventional calcination methods, raw phosphor materials are weighed and mixed; after being subjected to calcination in a fixed bed type electric furnace, are than pulverized using a mortar, and subsequently employed as a phosphor to form a phosphor. Herein, "fixed bed type" means that a powder sample is put in a vessel or a boat-shaped dish and calcined as such. A calcination apparatus employed may be an electric muffle furnace or ring furnace. Further, either before or after calcination, the phosphor is optionally subjected to wet mixing, washing, drying or sieving. In some cases, after being calcined and pulverized, the phosphor is further subjected to calcination to enhance calcination efficiency. The conventional calcination method is described in JP-B 1-26640, 63-55555 and 63-28955 (herein, the term "JP-B" means an examined and published Japanese Patent).

Although the emission mechanism of the stimulable phosphor is not sufficiently elucidated, in the case of BaFBr, it is assumed to be necessary that Ba is substituted by an activator such as Eu in its crystal structure and that Eu is reduced from $Eu^{3+}$ to $Eu^{2+}$. The substitution and reduction can be achieved by calcination at a high temperature, in an atmosphere of reducing gas. The extent of the activating treatment at a high temperature can be deduced by measuring the emission intensity of a phosphor.

Stimulable phosphors according to the prior art are low in sensitivity due to insufficient activation of the phosphor via calcination. Particularly in a BaFX phosphor, with formation of an activator, the amount of $Eu^{2+}$ was insufficient. To enhance the absorbing amount of X-rays in a radiation image conversion panel, it was attempted to substitute a halogen element with another element having a higher atomic number. For example, it was attempted to prepare phosphors such as $BaF(Br_x,I_{1-x}):Eu^{2+}$ and $BaFI:Eu^{2+}$ by substituting a part of X with I (iodine), but formation of $Eu^{2+}$ was insufficient, leading to unacceptably low sensitivity.

According to the inventors of the present invention, the reasons for insufficient calcination, according to the prior art, are as follows:

1) there is too large a difference in temperature between the surface and the interior of the powder bed, placed on the boat, during calcination;
2) it is hard for an atmosphere of treatment gas such as reducing gas to reach the interior of the powder bed;
3) since sintering occurs with calcination at a high temperature, it is hard to achieve completion of calcination and reduction in the interior of, or between, powder particles; and
4) in the case of BaFX, heating for a long time to obtain activation results in the release of an amount of halogen gas from the raw material and the gas deposits, without diffusing, in the interor of the powder bed, leading to discoloring and deterioration of desired characteristics.

In general, the smaller the stimulable phosphor particles, the more advantageous they are for graininess and sharpness, and thereby the filling ratio of the phosphor in a phosphor layer can be increased. An increase of the filling ratio of the phosphor in a phosphor layer leads to improved characteristics, such as enhancement of emission intensity. The phosphor described above has an average particle size of 3 to 7 μm. To increase the filling ratio, the content of the binder is decreased and the phosphor layer is subjected to compression treatment to reduce voids. However, when phosphor particles at a size of 3 μm or more are subjected to compression, the phosphor particles are destroyed to form planar particles, leading to deterioration of sharpness of the radiation image conversion panel. Therefore it is desirable to form the phosphor layer without applying compression. It is effective to increase the filling ratio by concurrently incorporating phosphor particles of a smaller size. However, it has been proved that the use of smaller phosphor particles produced problems such that instantaneous emission emitted upon exposure to X rays increased and stimulated emission decreased so that afterglow of instantaneous emission became signal noise when reading the radiation image.

SUMMARY OF THE INVENTION

The present invention relates to a radiation image conversion panel by the use of a stimulable phosphor, and an objective of the present invention is to provide a radiation image conversion panel superior in imaging performance in terms of sensitivity.

The above objective can be accomplished by the following constitution:

(1) a radiation image conversion panel comprising a support having thereon a phosphor layer containing a binder and a stimulable phosphor, wherein, when the phosphor layer is excited by the light at a maximum excitation wavelength (λ1) of the radiation image conversion panel, a maximum peak intensity of instantaneous emission (Int.), emitted from the phosphor layer, is within the following range:

500≦Int.≦5000 provided that said Int. is a maximum emission intensity at a wavelength of 185 to 800 nm, except for wavelengths of λ1 and 2×λ1, and said Int. being expressed as a relative value, based on a peak intensity of Raman scattering of water measured with light at a wavelength of 350 nm being 1;

(2) the radiation image conversion panel described in (1), wherein Int. is preferably within the following range: 900≦Int.≦2500;

(3) the radiation image conversion panel described in (1) wherein the preferred stimulable phosphor is represented by the following formula (1):

$(Ba_{1-x}M^2_x)FX:yEu^{2+}$      formula (1)

wherein $M^2$ is an alkaline earth metal selected from the group consisting of Mg, Ca, Sr, Zn and Cd; X is a halogen atom selected from the group consisting of Cl, Br and I; and x and y are numbers within the range of 0≦x≦0.6 and 0<y≦0.2, respectively;

(4) the radiation image conversion panel described in (3), wherein X is preferably I;

(5) the radiation image conversion panel described in (1), wherein the stimulable phosphor is preferably comprised of phosphor particles with an average particle size of 0.1 to 3 μm;

(6) the radiation image conversion panel described in (1), wherein at least 10% by weight of the stimulable phosphor is preferably particles with sizes of 0.1 to 1.0 μm;

(7) the radiation image conversion panel described in (1), wherein a packing ratio of the stimulable phosphor contained in the phosphor layer is preferably 60 to 80%.

DETAILED DESCRIPTION OF THE INVENTION

The radiation image conversion panel according to the invention comprises a support provided thereon with a phosphor layer containing a binder and a stimulable phosphor, wherein, when the phosphor layer is excited by light at a maximum excitation wavelength (λ1), the phosphor layer exhibits instantaneous emission having the maximum intensity (Int.) within the following range:

500≦Int.≦5000 provided that Int. is the maximum emission intensity at a wavelength within the range of 185 to 800 nm, except for wavelengths of λ1 and 2×λ1. The maximum excitation wavelength can be determined using a fluorophotometer, as follows. The phosphor layer is excited by being exposed to a monochromatic light, which is spectrally separated through a monochrometer, and the of intensity of instantaneous emission intensity, emitted from the phosphor layer, is measure with the fluorophotometer, at varying wavelengths of the light, wherein the wavelength at which the maximum emission is obtained is the maximum excitation wavelength, $\lambda 1$. Herein the intensity, Int., is shown as a relative value, based on the peak intensity of Raman scattering of water measured with light of a wavelength of 350 nm being 1. In cases where the radiation image conversion panel is provided with a protective layer, the protective layer is removed so that phosphor layer becomes the outermost layer of the panel. Further, in cases where at least one of the constituting layers is colored, the colored layer must be decolorized before subjecting to the intensity measurement.

A precursor of the stimulable phosphor represented by the above-described formula (1) can be prepared in the liquid phase method or the solid phase method. It is preferable to prepare the stimulable phosphor according to the liquid phase method. The representative preparation methods 1 and 2 of the stimulable phosphor precursor will be explained as below.

Preparation Method 1:

The method comprises the steps of:

(a) preparing an aqueous mother liquor containing at least 2N $BaX_2$ (preferably at least 2.7N $BaX_2$), and a halide of Eu, provided that when x of formula (1) is not zero, the mother liquor further contains a halide of $M^2$, (b) adding an aqueous solution containing an at least 5N inorganic fluoride (preferably, ammonium fluoride or alkali metal fluoride) to the mother liquor while maintaining a temperature of the mother liquor at 50° C. or more (preferably 80° C. or more) to form a crystalline precipitate of a precursor of a rare earth activated alkaline earth metal fluorohalide stimulable phosphor, (c) separating the precipitate of the precursor from mother liquor, and (d) calcining the separated precipitate (preferably, performing calcination of the precipitate while avoiding sintering of the precipitate).

Preparation Method 2

The method comprises the steps of:

(a) preparing an aqueous mother liquor containing an at least 3N ammonium halide (preferably, at least 4N), and a halide of Eu (i.e., a chloride, bromide or iodide thereof), provided that when x of formula (1) is not zero, the mother liquor further contains a halide of $M^2$, when y is not zero, the mother liquor further contains an alkoxide compound of $M^2$ and when Z is not zero, the mother liquor further contains a halide of $M^3$, (b) adding an aqueous solution containing an at least 5N (preferably, at least 8N) inorganic fluoride (ammonium fluoride or alkali metal fluoride) and an aqueous solution containing $BaX_2$ to the mother liquor while maintaining a temperature of the mother liquor at 50° C. or more (preferably, adding the solutions with keeping constant a ratio of fluorine of the former solution to barium of the latter solution) to form a crystalline precipitate of a precursor of a rare earth activated alkaline earth metal fluorohalide stimulable phosphor, (c) separating the precipitate of the precursor from the mother liquor, and (d) calcining the separated precipitate (preferably, performing calcination of the precipitate while avoiding sintering of the precipitate).

The halide of Eu can be added at any time during the course of forming the precipitate. Thus, the halide may be added to a reaction mother liquor prior to the start of reaction, at the time of adding an aqueous solution of the inorganic fluoride (preferably ammonium fluoride or alkali metal fluoride), or at the time of or after adding the inorganic fluoride aqueous solution and an aqueous solution of $BaX_2$. In the above, solvents may not be limited to water, but alcohols and esters can be employed.

The particle size of the phosphor used in the invention can be measured through electron microscopic observation thereof, and defined as (1+w)/2, wherein 1 is the longest axis and w is the longest axis vertical to the axis (1). The average particle size is a mean value of sphere equivalent diameters of 200 particles which are selected at random from the electronmicrograph.

Phosphor particles (crystals) relating to the invention are preferably monodisperse, and a coefficient of variation of the particle size is 20% or less and preferably 15% or less. Herein, a coefficient of variation of the particle size is represented as a standard deviation of particle sizes divided by the average particle size and times 100 (%).

Besides the solid phase method described above, the phosphor may be prepared by the solid phase method. Preparation by the solid phase method is referred to JP-As afore-described in (1) through (14). Furthermore, the liquid phase method is referred to Japanese Patent Application No. 8-265525, paragraph [0050] to [0059].

The preparing method 1 of the stimulable phosphor is further explained in detail, as below.

Preparation of a precipitate of precursor crystals and preparation of stimulable phosphor:

At first, material(s) other than a fluoride compound are dissolved in an aqueous medium. Thus, $BaX_2$ and a halide of Eu (and if necessary, a halide of $M^2$) are each added into an aqueous solvent and mixedly dissolved to prepare an aqueous solution. In this case, amounts of $BaI_2$ and the aqueous solvent are previously adjusted so as to have a concentration of $BaX_2$ of 2N or more. A small amount of acid, ammonia, alcohol, water-soluble polymer or fine grained powder of water-insoluble metal oxide may be added thereto. The solution (reaction mother liquor) is maintained at 50° C.

Next, into the reaction mother liquor maintained at 50° C. with stirring, an aqueous solution of an inorganic fluoride (such as ammonium fluoride or alkali metal fluoride was introduced through a pipe provided with a pump. The aqueous solution is preferably introduced to a portion in which stirring is vigorously performed. Introduction of the fluoride aqueous solution into the reaction mother liquor results in precipitation of precursor crystals of the rare earth activated alkaline earth metal fluorohalide phosphor represented by formula (1).

The resulting crystal of the phosphor precursor are separated from the solution through filtration or centrifugation, washed sufficiently with liquid such as methanol and dried. To the dried crystal of the phosphor precursor was added an anti-sintering agent such as alumina fine powder or silica fine powder, which is adhered to the surface of the crystals. It is possible to save addition of the anti-sintering agent by choosing the calcination condition.

Further, the phosphor precursor crystals are charged into a heat-resistant vessel such as silica port, alumina crucible or silica crucible and then placed in a central portion of an electric furnace to be calcined without causing the crystals to sinter. The crystals are calcined at a temperature of 400 to 1300° C. and preferably 500 to 1000° C. The calcination time is dependent on the charging amount of a raw material mixture of the phosphor, the calcination temperature and a temperature at the time of being taken out from the furnace, and preferably 0.5 to 12 hrs.

Calcination is carried out in an atmosphere, e.g., in a neutral atmosphere such as nitrogen gas atmosphere, argon gas atmosphere or nitrogen gas atmosphere containing a small amount of hydrogen gas, weakly reducing atmosphere such as carbon dioxide atmosphere containing a small amount of carbon mono-oxide, or an atmosphere in which a small amount of oxygen is introduced.

Thus, according to the above-described calcination, an objective stimulable phosphor of a rare earth activated alkaline earth metal fluorohalide can be obtained.

The stimulable phosphor of a rare earth activated alkaline earth metal fluorohalide represented by formula (1) above-described can also be prepared according to the method (method 1) comprising (a) preparing an aqueous solution containing an ammonium halide ($NH_4Cl$, $NH_4Br$ or $NH_4I$) and a halide of Eu and with a concentration of the ammonium halide of 3N or more, provided that when x is not zero, the mother liquor further contains a halide of $M^2$; (b) adding continuously or intermittently an aqueous solution containing an inorganic fluoride and an aqueous solution containing $BaX_2$ to the above-described aqueous solution while maintaining a constant temperature and with keeping a ratio of fluorine of the solution to barium of the solution to form a precipitate of precursor crystals of the rare earth activated alkaline earth metal fluorohalide stimulable phosphor; (c) separating the precipitate of the precursor crystals from a mixed aqueous solution; and (d) calcining the separated precipitate with avoiding sintering of the precipitate.

This method will be further explained in detail.

At first, material(s) other than a fluoride compound and $BaI_2$ and ammonium halide ($NH_4Br$, $NH_4Cl$ and $NH_4I$) are dissolved in an aqueous medium. Thus, an ammonium halide and a halide of Eu (and if necessary, a halide of $M^1$, an alkoxide compound of $M^2$ or a halide of $M^3$) are each added into an aqueous medium and mixedly dissolved to prepare an aqueous solution. In this case, amounts of the ammonium halide and the aqueous solvent are previously adjusted so as to have a concentration of the ammonium halide of 3N or more. A small amount of acid, ammonia, alcohol, water-soluble polymer or fine grained powder of water-insoluble metal oxide may be added thereto. The solution (reaction mother liquor) is maintained at a constant temperature.

Next, into the reaction mother liquor maintained at 50° C. with stirring, an aqueous solution of an inorganic fluoride (such as ammonium fluoride or alkali metal fluoride and an aqueous solution of $BaI_2$ were simultaneously introduced continuously or intermittently through a pipe provided with a pump, with adjusting so as to keep constant the ratio of the fluoride to $BaI_2$. The aqueous solution is preferably introduced to a portion in which stirring is vigorously performed. Introduction of the fluoride aqueous solution into the reaction mother liquor results in precipitation of precursor crystals of the rare earth activated alkaline earth metal fluoroiodide phosphor represented by formula (1).

Subsequently, the resulting crystals of the phosphor precursor are separated from the solvent, dried and subjected to calcination in a manner similar to the method 1 to obtain an objective stimulable phosphor of a rare earth activated alkaline earth metal fluoroiodide.

Next, the phosphor precursor crystals obtained in the liquid phase method described in Japanese Patent Application 8-265525 are charged into a heat-resistant vessel such as a silica pot, an alumina crucible or a silica crucible and then placed in the central portion of an electric furnace to be calcined without causing the crystals to sinter. Phosphor precursors afore-mentioned or the following solid mixture, as described later, of $BaF_2$, $BaI_2$, and $EuF_3$ may be subjected to the calcination treatment.

Calcination Process:

The crystals are calcined at a temperature between 600 and 1100° C. and preferably between 600 and 1000° C. The calcination time is dependent on the charging amount of the raw material mixture of the phosphor, the calcination temperature and the temperature at the time of removing from the furnace, and preferably between 0.5 and 12 hrs.

Calcination is carried out in a specified atmosphere, e.g., in a neutral atmosphere such as a nitrogen gas atmosphere, an argon gas atmosphere or a nitrogen gas atmosphere containing a small amount of hydrogen gas, a weakly reducing atmosphere such as carbon dioxide atmosphere containing a small amount of carbon mono-oxide; or an atmosphere in which a small amount of oxygen is introduced. Specifically, a weakly reducing atmosphere is preferred.

Calcination Apparatus:

A heat source such as conventional electric furnaces and burner furnaces are employed. Examples of the apparatus for vibrating or fluidizing the calcinated powder include:

1) moving the center of gravity of the powder sample in a dish or a boat within an electric furnace and providing it with a stirrer or a shaker;

2) moving the center of gravity of the powder sample in a dish or a boat by blowing a gas onto or into the sample; and 3) using a rotary electric furnace (rotary kiln), for example, a reaction vessel with rotary or semi-rotary reciprocation within an electric furnace to stir and mix the powder.

Methods 1) to 3) can be employed alone or in combination. The rotary electric furnace can be employed, for example, under the following conditions:

rotation speed; 1–50 rpm, preferably 1–20 rpm, reaction vessel; quartz or SUS (stainless steal), and a rotary blade for stirring may be provided therein. Beads (quartz or ceramics) or balls with a diameter of 5 to 30 mm may concurrently be present therein for the purpose of stirring and mixing, and thereby excessive sintering can be prevented. The reason for providing vibration or fluidization of the powder during calcination is that if powder particles are stirred during calcination, heat and atmospheric gas such as a reducing gas can sufficiently and uniformly reach the interior of the particles, leading to complete calcination within a short time. It is also advantageously effective for the structure of the phosphor, elimination of an element and prevention of excessive sintering.

According to the above-described calcination process, the objective stimulable phosphor can be obtained. Of the stimulable phosphors, a bivalent europium-activated alkaline earth metal fluorohalide phosphor, an iodide containing bivalent europium activated alkaline earth metal fluorohalide phosphor, an iodide containing rare earth activated rare earth oxyhalide phosphor, and an iodide containing bismuth activated alkaline metal halide phosphor exhibit stimulated emission with a high intensity.

Preparation of Panel:

As supports used in the radiation image converting panel according to the invention are employed a various types of -polymeric material, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 80 to 1000 μm and preferably 80 to 500 μm in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butylate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound (s) are uniformly dispersed in a binder solution.

The binder is employed in an amount of 0.01 to 1 part by weight per 1 part by weight of the stimulable phosphor. A smaller amount of the binder is preferred in terms of sensitivity and sharpness of the radiation image converting panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiation image converting panel, the kind of the phosphor and an addition amount of the epoxy group-containing compound. Examples of solvents used for preparing the coating solution include lower alcohols such as methanol, ethanol, 1-propanol, 2-propanol, and n-butanol; chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

There may be incorporated, in a coating solution of the stimulable phosphor layer, stearic acid, phthalic acid, caproic acid and oleophilic surfactants for the purpose of improving dispersibility of the stimulable phosphor particles. The plasticizer may optionally incorporated. Examples of the plasticizer include phthalate esters such as diethyl phthalate and dibutyl phthalate; aliphatic dibasic acid esters such as diisodecyl succinate and dioctyl adipinate; and glycolic acid eaters such as ethylphthalylethyl glycolate and butylphthalylbutyl glycolate.

The coating solution as prepared above was uniformly coated on the surface of the subbing layer to form a coating layer. Coating can be carried out by conventional coating means, such as doctor blade, roll coater and knife coater. Subsequently, the coated layer is gradually dried to complete formation of the stimulable phosphor layer on the subbing layer. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support. A thickness of the stimulable phosphor layer of the radiation image converting panel depends on characteristics of the converting panel, the kind of the stimulable phosphor and a mixing ratio of the binder to the stimulable phosphor, and is generally 20 μm to 1000 μm and preferably 20 to 500 μm.

EXAMPLES

The present invention will be further explained based examples.

Examples 1 to 3

Phosphor precursors prepared by the solid phase method,

| | | |
|---|---|---|
| (1) | $BaF_2$ (Extra grade, product by Kanto Kagaku) | 1 mol |
| (2) | $BaI_2$ (Extra grade, product by Kanto Kagaku) or $BaBr_2$ | 1 mol |

(3) $EuF_3$ (product by Furuuchi Chemicals) in an amounr as shown in Table 1 were mixed in an automatic mortar and subjected to calcination under the conditions as shown in Table 1. The resulting phosphor particles were classified and there were obtained particles with an average size of 7 μm.

Comparative Examples 1 to 8

Samples were prepared in the same manner as in Example 1, 2 or 3, except that the phosphor precursor particles were subjected to calcination according to the condition as shown in Table 1.

Examples 4 to 6

A precursor of europium activated barium fluoroiodide stimulable phosphor was prepared in the following manner. To a reaction vessel were added to 2500 ml of a $BaI_2$ aqueous solution (3.5 N) and 125 ml of a EuBr$_3$ aqueous solution (0.2 N). The mother liquor in the reaction vessel was maintained at a temperature of 83° C. with stirring. An ammonium fluoride aqueous solution (8N) of 250 ml was introduced to the mother liquor through a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. To prevent deformation of phosphor particles due to sintering during calcination and the change of particle size distribution due to fusing of particles, ultrafine-grained alumina was added thereto in an amount of 1% by weight, with stirring sufficiently to cause the alumina to adhere uniformly to the surface of the crystals. The crystals were charged into a silica boat and calcined under the conditions as shown in Table 1 to obtain europium activated barium fluoroiodide phosphor particles. The particles were subjected to classification to obtain phosphor particles with an average size of 7 μm.

Radiation image conversion panels were prepared in the following manner. The prepared phosphor of europium activated barium fluoroiodide of 382 g and a polyester resin of 18 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a given thickness was formed.

Fluoro-resin, fluoroolefin-vinyl ether copolymer (Lumiflon LF100, trade name, produced by Asahi Glass Co.) of 70 g, cross-linking agent, isocyanate (Desmodule Z4370, produced by Sumitomo-Beiern) of 25 g, bisphenol A-type epoxy resin of 5 g and silicone resin fine powder (KMP-590, produced by Shietsu kagaku, particle size 1-1 mm) of 10 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 μm was obtained. According to the above procedure, there were obtained radiation image conversion panels having a stimulable phosphor layer, of Examples 1 to 6 (denoted as E-1 to 6) and Comparative Examples 1 to 8 (denoted as C-1 to 8).

Calcination described above was conducted using the following apparatus. In Comparative Examples was employed a conventional electric furnace or burner furnace. As an apparatus for vibrating or fluidizing powder, in Example 5, was employed a technique of providing an electric furnace with a stirrer or shaker and moving therein the center of gravity of the powder in a dish or boat. In Examples 1 to 4 and Comparative Examples 6 to 8 was employed a rotary electric furnace (rotary kiln) in which the reaction vessel (quartz) was rotated at a rotating speed of 15 rpm, without the use of rotaing blade for stirring, to mix the powder. In this case, beads (quartz) with a diameter of 10 mm was concurrently present therein.

Radiation image conversion panels were evaluated with respect to photosensitive characteristics, according to the following procedure.

The intensity of instantaneous emission was measured using a spectral fluorophotometer (F301 available from Hitachi). Each of the radiation image conversion panels were cut into a size of 20×20 mm and set into a holder. Each of the panel samples was excited by scanning with light at the wavelengths ranging 185 to 800 nm to determine the maximum excitation wavelength. As a result, the maximum excitation of each panel was exhibited at the wavelength of 318 nm (i.e. the maximum excitation wavelength of each panel was 318 rm). Next, each panel was excited with light at the wavelength of 318 nm to determine the intensity of the maximum emission peak and its wavelength. Measurement was performed under the following conditions:

Excitation (Ex) bandpass=1.5 nm,

Emission (Em) bandpass=1.5 nm,

Scanning speed=60 nm/min., and

Response=2 sec.

As a result, each panel exhibited the maximum emission intensity (I') at a wavelength of 405 nm. The maximum emission intensity of each panel was shown as a relative value, based on the peak intensity of Raman scattering of water being 1. Raman scattering of water was measured under the following conditions:

Ex bandpass=5 nm,

Em bandpass=5 nm,

Scanning speed=60 nm/min., and

Response=2 sec.

Raman scattering of water, which was excited with light of 350 nm, exhibited a peak with an intensity of 1.925 ($I_0$) at a wavelength of 398.4 nm. Accordingly, the maximum emission intensity of each panel was shown as a relative value (I), based on the peak intensity of Raman scattering of water being 1, as follows.

$$I=I'/I_0$$

Each of the radiation image conversion panels, after being exposed to a X-ray at tube voltage of 80 KVp, was stimulated by scanning exposure with a 200 mW semiconductor laser (780 nm) and stimulated emission emitted from the phosphor layer was measured by a photoreceptor (photomultiplier with spectral sensitivity S-5) to determine the emission intensity (i.e., sensitivity). The sensitivity was shown as a relative value, in Table 1.

TABLE 1

| Sample | Phosphor | | | Int. | Calcination condition | | | | Sensitivity |
|---|---|---|---|---|---|---|---|---|---|
| | | | | | Process[*3] | Temp. (° C.) | Gas flow[*4] | Time (hr) | |
| C-1 | BaFBr:Eu$^{2+}$ | (1)[*1] | S[*2] | 350 | A | 1000 | 0.5 | 4 | 0.1 |
| C-2 | BaFI:Eu$^{2+}$ | (5) | S | 440 | A | 900 | 0.5 | 4 | 0.2 |
| C-3 | BaFI:Eu$^{2+}$ | (1) | S | 440 | B | 900 | 0.5 | 4 | 0.3 |
| C-4 | BaFI:Eu$^{2+}$ | (1) | S | 300 | A | 900 | 2.0 | 4 | 0.1 |
| C-5 | BaFI:Eu$^{2+}$ | (1) | S | 100 | A | 900 | 0.5 | 2 | 0.08 |

TABLE 1-continued

| Sample | Phosphor | | Int. | Calcination condition | | | | Sensitivity |
|---|---|---|---|---|---|---|---|---|
| | | | | Process*[3] | Temp. (° C.) | Gas flow*[4] | Time (hr) | |
| E-1 | BaFBr:Eu$^{2+}$ | (1) | S | 700 | D | 1000 | 0.5 | 1 | 1.4 |
| E-2 | BaFI:Eu$^{2+}$ | (1) | S | 800 | D | 900 | 0.5 | 1 | 1.6 |
| E-3 | BaFI:Eu$^{2+}$ | (5) | S | 4500 | D | 900 | 0.5 | 1 | 1.1 |
| E-4 | BaFI:Eu$^{2+}$ | (1) | L*[2] | 1100 | D | 900 | 0.5 | 1 | 1.8 |
| E-5 | BaFI:Eu$^{2+}$ | (1) | L | 1050 | E | 900 | 0.5 | 1 | 1.6 |
| E-6 | BaFI:Eu$^{2+}$ | (1) | L | 1000 | D | 900 | 0.5 | 0.5 | 2 |
| C-6 | BaFI:Eu$^{2+}$ | (1) | L | 7 | C | 100 | 0.5 | 1 | 0 |
| C-7 | BaFI:Eu$^{2+}$ | (1) | L | 31 | C | 500 | 0.5 | 1 | 0.02 |
| C-8 | BaFI:Eu$^{2+}$ | (I) | L | 400 | C | 1200 | 0.5 | 1 | 0.3 |

*[1]Eu-content ($\times 10^{-3}$ mol)
*[2]Phosphor preparation: Solid phase method (S), Liquid phase method (L)
*[3]Calcination process: A, Standing without action; B, two calcination without action.; C, Rotary kirn; D, Rotary kirn with fluidizing; E, Shaker with vibrating
*[4]Gas flow rate, $H_2/N_2$, $H_2 = 5\%$ As can be senn from the Table, radiation image conversion panels of example 1 to 6 (E-1 to 6) ehhibited superior image characteristics expressed in terms of sensitivity, as compared to those of Comparative examples (C-1 to 8).

Example 7

A precursor of europium activated barium fluoroiodide stimulable phosphor was prepared in the following manner. To a reaction vessel were added to 2500 ml of a $BaI_2$ aqueous solution (3.5 N) and 125 ml of a $EuBr_3$ aqueous solution (0.2 N). The mother liquor in the reaction vessel was maintained at a temperature of 83° C. with stirring. An ammonium fluoride aqueous solution (8N) of 250 ml was introduced to the mother liquor through a roller pump to form precipitates. Thereafter, the reaction mixture was further kept at the temperature for 2 hr. with stirring to ripen the precipitates. The precipitates were filtered, washed with methanol and dried in vacuo to obtain crystals of a phosphor precursor of europium activated barium fluoroiodide. The crystals were charged into a silica boat and calcined under an atmosphere of hydrogen gas at 850° C. for 2 hr. to obtain europium activated barium fluoroiodide phosphor particles. The particles were subjected to classification to obtain phosphor particles with an average size of 2 μm.

Phosphor composition:
Interior BaFI:xEu x=0.0024
Exterior BaFI:yEu y=0.0020

A radiation image conversion panel was prepared as follows. The prepared phosphor (a) of europium activated barium fluoroiodide of 427 g and a polyester resin (Toyobo Biron 200)) of 18 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a given thickness was formed.

Fluoro-resin, fluoroolefin-vinyl ether copolymer (Lumiflon LF100, trade name, produced by Asahi Glass Co.) of 70 g and cross-linking agent, isocyanate (Nippon Polyurethane C-3041) of 25 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 μm was obtained. According to the above procedure, there was obtained a radiation image conversion panel comprising a stimulable phosphor layer.

Example 8

A radiation image conversion panel was prepared in the same manner as in Example 7, except that the europium activated barium fluoroiodide particles were varied to those having an average size of 1.0 μm. (Phosphor composition:

| Interior | BaFI:xEu | x = 0.0024; |
|---|---|---|
| Exterior | BaFI:yEu | y = 0.0020) |

Example 9

A radiation image conversion panel was prepared in the same manner as in Example 7, except that the europium activated barium fluoroiodide particles were varied to those having sizes of 0.1 to 1.0 μm and an average size of 0.65 μm μm. (Phosphor composition: Interior BaFI:xEu x=0.0024; Exterior BaFI:yEu y=0.0019)

Example 10

A radiation image conversion panel was prepared in the same manner as in Example 7, except that the europium activated barium fluoroiodide particles were varied to those having an average size of 3.0 μm. (Phosphor composition:

| Interior | BaFI:xEu | x = 0.0024; |
|---|---|---|
| Exterior | BaFI:yEu | y = 0.0019) |

Example 11

A radiation image conversion panel was prepared in the same manner as in Example 7, except that the europium activated barium fluoroiodide particles were varied to those having sizes of 1 to 10 μm and an average size of 5.0 μm μm. (Phosphor composition: Interior BaFI:xEu x=0.0024; Exterior BaFI:yEu y=0.0020)

Example 12

A radiation image conversion panel was prepared in the same manner as in Example 7, except that the europium activated barium fluoroiodide particles were varied to those comprised of a mixture of particle having sizes of 0.1 to 1

μm and particles having sizes of 1 to 10 μm, in a ratio by weight of 80:20.

Example 13

A radiation image conversion panel was prepared in the same manner as in Example 13, except thatthe ratio was varied to 60:40.

Example 14

A radiation image conversion panel was prepared in the same manner as in Example 13, except that the ratio was varied to 40:60.

Example 15

A radiation image conversion panel was prepared in the same manner as in Example 13, except that the ratio was varied to 20:80.

Example 16

A radiation image conversion panel was prepared in the same manner as in Example 13, except that the ratio was varied to 10:90.

The composition of the phosphor can be determined according to the following procedure. A phosphor sample is allowed to be dipped into aqua regia to decompose from the surface of phosphor particles and when the phosphor particles become 0.2 μm in radius, they are filtered off and separated. The filtrate is analyzed by ICP, as surface composition of the phosphor particles. Separated phosphor particles are washed with alcohol, dissolved in aqua regia and subjected to analysis by ICP, as central composition of the phosphor particles. Herein, the term, ICP refers to "Inductively Coupled Plasma Emission Spectrometry".

Radiation image comversion panels of Examples 6 to 17 were each evaluated with respect to the ratio of N/S. Thus, a radiation image conversion panel, after being exposed to X-ray at a tube voltage of 80 KVp, was stimulated by scanning exposure with a 200 mW semiconductor laser (780 nm) and stimulated emission emitted from the phosphor layer was measured by a photoreceptor (photomultiplier R1305, produced by Hamamatsu Photonics Co.) to determine the emission intensity (S). Further, after similarly exposed to X-ray in the same manner as above, emission from the plate, without exposure to laser was measure to determine the intensity (N), i.e., afterglow of instantaneous emission. Results thereof are shown in Table 2.

The filling ratio of the phosphor in the phosphor layer can be determined according to the following manner. At first, a protective layer of the radiation image conversion panel is removed and then the phosphor layer is eluted from the panel, using an organic solvent such as methyl ethyl ketone and dried to remove the solvent. The resulting mixture of the phosphor and binder is further burned at 600° C. for a period of 1 hr. to remove the binder and obtain the phosphor as residue (N g). The filling ratio of luminescent substance each can be calculated based on the following formula:

Filling ratio of phosphor=$[N/(P \times Q \times R)] \times 100(\%)$ wherein P is a thickness of the phosphor layer (cm), Q is an area of the detective sheet ($cm^2$) and R is a density of the phosphor ($g/cm^3$).

TABLE 2

| Sample | Av. particle size (μm) | Particles (0.1–1 mm) | Fillig ratio | N/S ratio (%) |
|---|---|---|---|---|
| E-6 | 7 | 0 | 32 | 0.006 |
| E-7 | 2 | 5 | 66 | 0.0007 |
| E-8 | 1 | 50 | 72 | 0.0002 |
| E-9 | 0.65 | 100 | 75 | 0.0001 |
| E-10 | 3 | 0 | 42 | 0.003 |
| E-11 | 5 | 0 | 36 | 0.005 |
| E-12 | 1.1 | 80 | 68 | 0.0003 |
| E-13 | 1.6 | 60 | 67 | 0.0005 |
| E-14 | 2.1 | 40 | 66 | 0.0007 |
| E-15 | 2.4 | 20 | 64 | 0.0009 |
| E-16 | 2.8 | 10 | 60 | 0.001 |

What is claimed is:

1. A radiation image conversion panel comprising a support having thereon a phosphor layer containing a binder and a stimulable phosphor, wherein, when the phosphor layer is excited by being exposed to light at a maximum excitation wavelength (λ1) of the phosphor, a maximum peak intensity of instantaneous emission (Int.) emitted from the phosphor layer satisfies the following:

500 ≦ Int. ≦ 5000 provided that said Int. is a maximum emission intensity at a wavelength within the range of 185 to 800 nm, except for wavelengths of λ1 and 2× λ1, and said Int. being expressed as a relative value, based on a peak intensity of Raman scattering of water excited with light at a wavelength of 350 nm being 1.

2. The radiation image conversion panel of claim 2, wherein said Int. satisfies the following:

900 ≦ Int. ≦ 2500.

3. The radiation image conversion panel of claim 1 wherein the stimulable phosphor is represented by the following formula:

$$(Ba_{1-x}M^2{}_x)FX{:}yEu^{2+}$$

wherein $M^2$ is an alkaline earth metal selected from the group consisting of Mg, Ca, Sr, Zn and Cd; X is a halogen atom selected from the group consisting of Cl, Br and I; and x and y are numbers within the range of $0 \leq x \leq 0.6$ and $0 < y \leq 0.2$, respectively.

4. The radiation image conversion panel of claim 3, wherein X is I.

5. The radiation image conversion panel of claim 1, wherein said stimulable phosphor is stimulable phosphor particles with an average particle size of 0.1 to 3 μm.

6. The radiation image conversion panel of claim 5, wherein at least 10% by weight of said stimulable phosphor particles is accounted for by particles having a size of 0.1 to 1.0 μm.

7. The radiation image conversion panel claim 1, wherein a filling ratio of the stimulable phosphor contained in the phosphor layer is between 60 and 80%.

* * * * *